United States Patent [19]

DePuy

[11] 4,241,410
[45] Dec. 23, 1980

[54] BINARY NUMBER GENERATION

[75] Inventor: Robert P. DePuy, Cherry Hill, N.J.

[73] Assignee: General Electric Company, Schenectady, N.Y.

[21] Appl. No.: 22,041

[22] Filed: Mar. 19, 1979

[51] Int. Cl.³ .............................................. G06F 7/48
[52] U.S. Cl. ................................................. 364/715
[58] Field of Search ....................... 364/715, 768, 770; 235/92 SA, 92 PE, 92 SH, 92 CC

[56] References Cited

U.S. PATENT DOCUMENTS 3,748,451  7/1973  Ingwersen ........................... 364/728

Primary Examiner—Jerry Smith
Attorney, Agent, or Firm—Julius J. Zaskalicky; James C. Davis, Jr.; Marvin Snyder

[57] ABSTRACT

Apparatus is described for the generation of a series of binary numbers which has a minimum value other than zero, has a major sequence of numbers in which successive numbers are separated by a first fixed increment starting from the minimum value and defining the range of the series of numbers, and has a plurality of minor sequences, each representing binary numbers of the series lying between respective successive numbers of the major sequence with each number of a minor sequence being spaced from a preceding number thereof by a second fixed increment.

7 Claims, 2 Drawing Figures

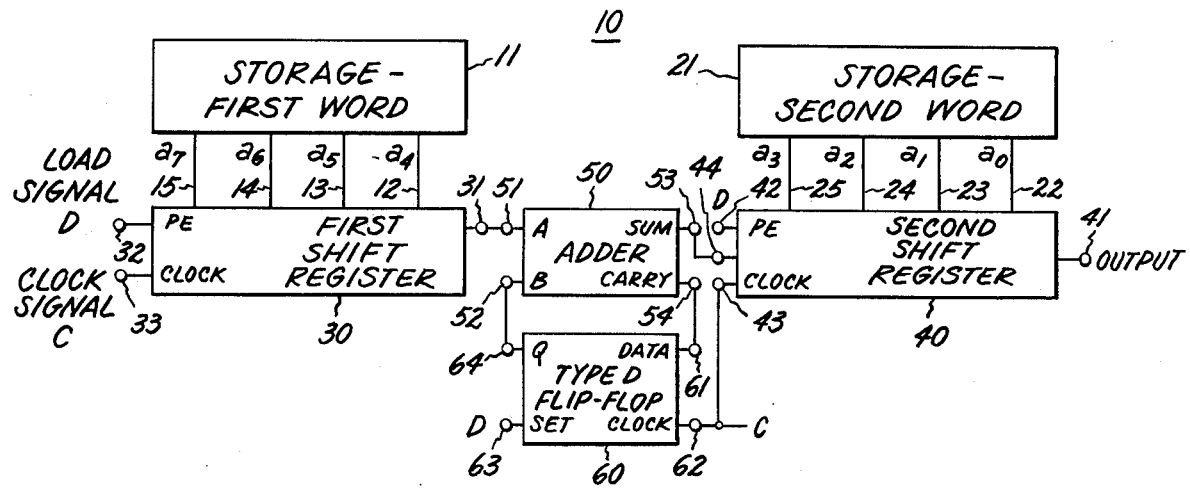
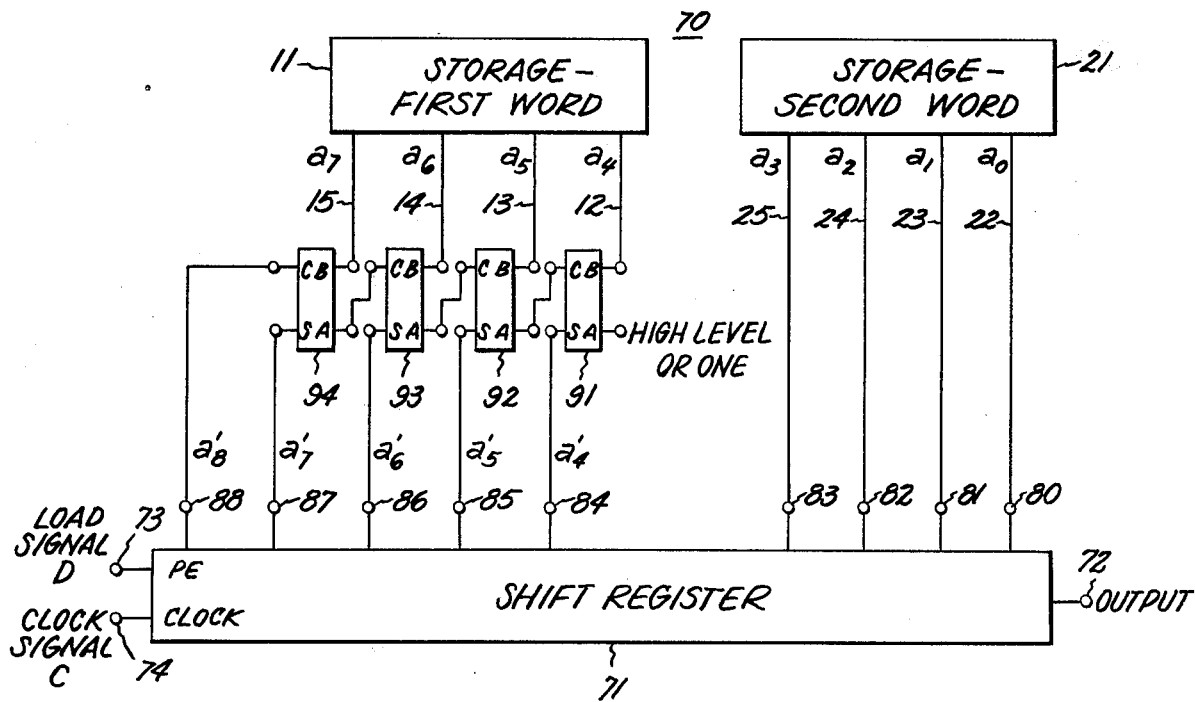

BINARY NUMBER GENERATION

The present invention relates to the generation of a binary number in a particular series of binary numbers.

In certain applications, such as in Overcurrent Relay Apparatus described and claimed in U.S. Patent Application Ser. No. 971,312, filed Dec. 20, 1978, assigned to the assignee of the present invention, and incorporated herein by reference thereto, it is necessary to provide limit numbers in binary form, each corresponding to a particular response characteristic of the apparatus. The limit numbers are selected from a series of numbers N bits in length which meet the following requirements:

(1) have a minimum value other than zero;
(2) have a major sequence of numbers in which successive numbers are separated by a first fixed increment starting from the minimum value and defining the range of the series of numbers; and
(3) have a plurality of minor sequences, each representing binary numbers of the series lying between respective successive numbers of the major sequence with each number of a minor sequence being spaced from a preceding number thereof by a second fixed increment and corresponding to vernier values between successive values of the major sequence of numbers.

Such a series of numbers could be devised and stored in binary form in a ROM (Read Only Memory) at locations which may be accessed by a pair of binary codes. Such means for providing a limit number from the particular series of limit numbers involves a relatively large amount of apparatus.

Accordingly, an object of the present invention is to provide a relatively simple apparatus for generating a particular binary number in a particular series of binary numbers, such as described above.

In accordance with an illustrative embodiment of the present invention, apparatus is described for providing a first binary word of k bits in which each of the binary values therof correspond to a respective number in the major sequence of numbers, and a second binary word of $N-(k+1)$ bits in which each of the binary values thereof correspond to a respective number in each of the minor sequences of numbers. Means are provided for adding a high level or one to the first binary word of k bits length to obtain a third binary word of $k+1$ bits in length. Means are provided for constituting the third word as the most significant bits of the N bit word representing the N bit number and for constituting the second word as the least significant bits of the N bit word. The binary word of N bits so constituted has a minimum value represented by a number in which the least significant bit of the $(k+1)$ word is one and the other bits are zero, and is further characterized by the fact that the bits of the first word determine the coarse values of the numbers of the series and the bits of the second word determine vernier or fine values of the series lying between successive coarse values of the series.

The novel features which are believed to be characteristic of the present invention are set forth with particularity in the appended claims. The invention itself, both as to its organization and method of operation, together with further objects and advantages thereof, may best be understood by reference to the following description taken in connection with the accompanying drawings wherein:

FIG. 1 is a block diagram of a preferred embodiment in accordance with the present invention.

FIG. 2 is a block diagram of another embodiment in accordance with the present invention.

Reference is now made to FIG. 1 which shows apparatus 10 in accordance with the present invention. In this embodiment the N bit word representing the series of binary numbers is shown as constituted of nine bits for convenience in describing and explaining the operation thereof. The apparatus 10 includes a first storage means 11 for storing a first word k bits in length representing a number of the major sequence of numbers of the series described above. Conveniently the first word is shown as consisting of four bits designated as bits $a_4-a_7$ from the least significant to the most significant bit appearing on bit lines 12-15, respectively. The storage means 11 may comprise a bank of four single-pole double-throw switches. The pole of each of the switches is connected to a respective one of the bit lines 12-15 and the throw of each of the switches then may access a high or a low voltage level corresponding to whether the respective bit of the word is a one or a zero. The apparatus includes a second storage means 21 for providing a second binary word of $N-(K+1)$ bits in length, each of the values of the second binary word corresponding to a respective number in each of the minor sequences of the series of numbers between successive numbers of the major sequence. Conveniently, the second word is shown as consisting of 4 bits designated bits $a_0-a_3$ from the least significant to the most significant bit appearing on bit lines 22-25, respectively. The storage means 21 may comprise a bank of four single-pole double-throw switches. The pole of each of the switches is connected to a respective one of the bit lines 22-25. Each of the poles of the switches can be connected to either a high level or a low level terminal depending upon whether a one or a zero is desired on the corresponding bit line. A first shift register 30 is provided including four stages serially connected with each stage having a parallel input to access a respective one of the bit lines 12-15 and an output terminal 31 connected to the least significant stage thereof. The shift register 30 is provided with a preset enable terminal 32 to which a load signal designated by the symbol D is applied with an output line from the least significant stage thereof. The shift register 30 is also provided with a clock signal terminal 33 to which a clock signal C is applied.

A second shift register 40 is provided including four stages serially connected, each stage having a parallel input connected to a corresponding ordered one of the bit lines 22-25. Shift register 40 is provided with an output terminal 41 upon which the output from the least significant stage of the shift register is received and having an input 44 connected to the serial input of the most significant stage of the shift register. The shift register 40 also includes a preset enable terminal 42 to which a load signal D is applied enabling the bits located on the bit lines 22-24 to be entered into the stages of the shift register and a clock terminal 43 to which clock signal C is applied.

An adding means in the form of an adder 50 is provided and includes a pair of input terminals 51 and 52, designated A and B, respectively, a sum output terminal 53, designated SUM, and a carry output terminal 54, designated CARRY. A carry transfer means 60 in the form of a Type D flip-flop is utilized in conjunction with the adder for providing the addition function. The flip-flop includes a data terminal 61, a clock terminal 62 to which a clock signal is applied, a set terminal 63 to which the load signal D is applied, and a Q or output terminal 64 which provides an output level in response to data on the data terminal 61 and a clock signal on the clock terminal 62.

The output terminal 31 of the first shift register is connected to the input terminal 51 of the adding means 50. The sum output terminal 53 of adder 50 is connected to the input terminal 44 of the second shift register 40. The carry output terminal 54 of the adding means 50 is connected to the data terminal 61 of carry transfer means 60. The output terminal 64 of the carry transfer means is connected to the input terminal 52 of the adding means 50.

The manner in which the apparatus 10 provides at the output of the second shift register 40 a nine bit word representing a number of a sequence of numbers of the character described above in response to the provision of a pair of codes designated as the first word and the second word in the storage means 11 and storage means 21, respectively, will now be explained. The first word is inserted in the storage means 11 by setting each of the four switches thereof to provide the bit desired on a respective one of the bit lines 12-15. Similarly, the second word is inserted in the second storage means 21 by properly setting the switches thereof to provide the bit desired on a respective one of the bit lines 22-25. Clock signal C is applied to the clock terminals 33, 43 and 62 of the first and second shift registers 30 and 40 and the D flip-flop 60, respectively. Load signal D is then applied to the preset enable terminal 32 of the first shift register 30 and to the preset enable terminal 42 of the second shift register 40 which enters the bits of the first word into the first shift register 30 and the bits of the second word into the second shift register thereby enabling the clock signal applied to these shift registers to initiate clocking of bits serially from one stage to the next to the outputs thereof. Concurrently, the load signal D is applied to set terminal 63 of the type D flip-flop. Accordingly upon appearance of the load signal D on terminal 63 a high level or one appears at the Q or output terminal 64 of the type D flip-flop 60 and hence at the input terminal 52 of the adder 50. This high level is added to the least significant bit applied to input terminal 51 from the output of shift register 30 to provide a sum at the sum terminal 53 and carry at the carry terminal 54. The sum is applied to the input terminal 44 of the second shift register. The carry is transferred by the D type flip-flop to the input terminal 52 of the adder. During the next clock signal cycle the next most significant bit from shift register 30 is available for addition in the adder. Thus, the bits in the first shift register 30 are clocked out in sequence from the least significant bit to the most significant bit and added to a carry in signal represented by the load signal D on terminal 63. The sums are applied to the input of the second shift register 40 where they are concurrently clocked out to provide at the output terminal 41 the output desired.

Reference is now made to Table 1 below in which is set forth six words out of a possible total of sixteen words which may constitute the second word applied to the storage means 21, representing numbers 0, 1, 2 and 13, 14 and 15.

TABLE 1

| EXAMPLE NO. | SECOND WORD | | | | DECIMAL VALUE |
|---|---|---|---|---|---|
| | $a_3$ | $a_2$ | $a_1$ | $a_0$ | |
| 1 | 0 | 0 | 0 | 0 | 0 |
| 2 | 0 | 0 | 0 | 1 | 1 |
| 3 | 0 | 0 | 1 | 0 | 2 |
| 14 | 1 | 1 | 0 | 1 | 13 |
| 15 | 1 | 1 | 1 | 0 | 14 |
| 16 | 1 | 1 | 1 | 1 | 15 |

The value of the four bits $a_0$-$a_3$ are set forth in columns so designated. The values of these words represent vernier or fine settings between a pair of coarse settings represented by the major sequence of numbers of the aforementioned series of numbers. The bits provided by the second word represent the least significant bits of an N bit word obtained at the output 41 of the second shift register 40.

Reference is now made to Table 2 below which shows six of a possible sixteen words of four bits each which may be inserted in the first storage means 11 and by action of the adding means 50 and the carry transfer means 60 to provide at the output of the adding means a five bit word having sixteen possible values starting from a minimum value of sixteen and extending in equal increments of 16 to 256.

TABLE 2

| EXAMPLE NO. | FIRST WORD | | | | ADD | THIRD WORD | | | | | DECIMAL VALUE |
|---|---|---|---|---|---|---|---|---|---|---|---|
| | $a_7$ | $a_6$ | $a_5$ | $a_4$ | | $a_8$ | $a_7'$ | $a_6'$ | $a_5'$ | $a_4'$ | |
| 1 | 0 | 0 | 0 | 0 | 1 | 0 | 0 | 0 | 0 | 1 | 16 |
| 2 | 0 | 0 | 0 | 1 | 1 | 0 | 0 | 0 | 1 | 0 | 32 |
| 3 | 0 | 0 | 1 | 0 | 1 | 0 | 0 | 0 | 1 | 1 | 48 |
| 14 | 1 | 1 | 0 | 1 | 1 | 0 | 1 | 1 | 1 | 0 | 224 |
| 15 | 1 | 1 | 1 | 0 | 1 | 0 | 1 | 1 | 1 | 1 | 240 |
| 16 | 1 | 1 | 1 | 1 | 1 | 1 | 0 | 0 | 0 | 0 | 256 |

The five bit word appearing at the output of the adding means 50 is constituted as the most significant bits of the N bit output word by serially clocking the five bit word through the second shift register 40 while the bits of the second word constituting the least significant bits of the N bit word are being shifted out of the second shift register 40. To augment the value of the N bit number by a factor or factors of two it is simply necessary to delay the availability of the bits by as many clock periods as factors of two are utilized, or in the alternative, if the N bit number is to be compared with some other number the load signal D may be delayed to introduce the proper number of factors of two in the number.

In the overcurrent relay apparatus of the aforementioned patent application, Ser. No. 971,312, an alternating current is periodically sampled and derived values in binary form corresponding to the analog samples are obtained. The derived values are added in sequence and an accumulated sum is obtained. A limit number in binary form is provided corresponding to a particular response characteristic of the apparatus. The accumulated number is compared with the limit number. An output is obtained when the accumulated number exceeds the limit number and is utilized to interrupt the alternating current. In such apparatus it is desired to have the range of responses represented by a range of limit numbers. The series of binary numbers, such as provided by the apparatus of the present invention, has particular utility in such apparatus. In the apparatus of the aforementioned application Ser. No. 971,312, the limit number is positioned with respect to the block of cyclically recurring block of 31 bits alloted for the accumulated sum of the derived values for the analog samples by synchronization of the load signal D which enters the first and second words in the first and second shift registers 30 and 40. The accumulated sum is accumulated in a block of 31 bits. The significant digits of the limit number is set forth in a block of 9 bits. The load signal D is set to occur at the $22^{nd}$ bit of the block of accumulated bits so that least significant bit is compared with the $23^{rd}$ bit of the accumulated block of bits and so on with the most significant bit of the N bit number being compared with the $31^{st}$ bit of the accumulated block of bits.

Reference is now made to FIG. 2 which shows a block diagram of another embodiment in accordance with the present invention. The elements of the block diagram of FIG. 2 identical to the elements of the block diagram of FIG. 1 are identically designated. The apparatus 70 of FIG. 2 includes an N stage shift register 71 having a plurality of serially connected stages with each stage having a respective parallel input for setting the bits thereof. Conveniently the shift register 71 is shown as a nine stage shift register and includes a serial output terminal 72 connected to the least significant stage, a load terminal 73 to which the load signal D is applied and a clock terminal 74 to which the clock signal C is applied. The parallel input terminals to the stages of the shift register 71 are designated 80-88 from the least significant stage to the most significant stage. The apparatus also includes a first word storage means 11 and a second word storage means 21 identical to the first and second word storage means of FIG. 1. Also included in the apparatus of FIG. 2 are four adders designated 91-94, each for processing a respective bit of the bits of the first word appearing on the bit lines 12-15 from the first word storage means 11. Each of the adders 91-94 includes an A input terminal, a B input terminal, a sum terminal, a sum terminal and a carry terminal designated by the symbols, A, B, S and C, respectively. The adder 91 is associated with the least significant bit $a_4$ of the first word and appearing on the bit line 12. The A terminal is connected to a level representing a high level or one. The B terminal is connected to the bit line 12. The carry terminal C is connected to the A input terminal of the succeeding adder 92 associated with the next most significant bit line 13. The B input terminal of this adder is connected to the bit line 13 on which appears the next most significant bit $a_5$. The sum terminal of adder 91 is connected to parallel input terminal 84, the input to the fifth stage of the shift register 71 and the bit appearing thereon is designated bit $a_4'$. The sum terminal of adder 92 is connected to the input terminal 85, the parallel input of the sixth stage of the register 71 and the bit appearing thereon is designated bit $a_5'$. The bit lines 14 and 15 are connected to the B terminals of adders 93 and 94, respectively. The A terminals of adders 93 and 94 are connected to the C or carry terminals of preceding adders 92 and 93, respectively. The sum terminal of adders 93 and 94 are connected to input terminals 86 and 87, respectively, on which appear bits designated $a_6'$ and $a_7'$, respectively. The carry terminal of the last adder 94 is connected to parallel input terminal 88 and the bit appearing thereon is represented as bit $a_8'$. The bit lines 22-25 of the second storage means 21 are connected to parallel inputs 80-83, respectively of shift register 71. The first word storage means 11 in conjunction with adders 91-94, connected as shown, function to provide at the outputs of the adders the five bits $a_4'$-$a_8'$ representing the addition of one to the bits of the first word having the bits $a_4$-$a_7$. The bits $a_4'$-$a_8'$ are referred to as the bits of a third word and constitute the most significant bits of the N bit binary word. The bits $a_0$-$a_3$ of the second word constitute the least significant bits of the N bit binary word. The bits of the first word are simultaneously available on the bit lines 12-15, thus the adders performed the indicated sum of adding one to the number represented by the first word and providing substantially simultaneously the five bits of the third word. With the bits of the N bit word available at the parallel inputs of the shift register 71 and with the clock signal C applied to terminal 74, the application of the load signal D to the preset enable terminal 73, enters the N bit word into the shift register 71 from which they are serially clocking out to the output terminal 72.

Thus, applicant has provided apparatus for providing a series of N bit numbers having the characteristics indicated, namely, a minimum number, a first word of k bits which determines the range of the numbers of the series, and a second word of $N-(k+1)$ bits which determines the resolution of the numbers. In the particular embodiment shown the minimum number is shown as 16, the first word is shown as constituted of the four bits, and the second word is shown as constitute the four bits. The proportion of the bits between the first and second words could be changed, for example, the first word could have been constituted of five bits and the second word constituted of three bits. In this case, the minimum number would be 8 and greater range of coarse numbers or settings would be provided. The resolution between coarse settings would be decreased. While the invention has been illustrated in apparatus in which the N bit word is constituted of nine bits it will of course be understood that any number of bits may be provided in the N bit word.

While the invention has been described in specific embodiments, it will be understood that modifications such as those described above may be made by those skilled in the art, and it is intended by the appended claims to cover all such modifications and changes as fall within the true spirit and scope of the invention.

What I claim as new and desire to secure by Letters Patent of the United States is:

1. Apparatus for providing an N bit word representing a series of binary numbers, said series consisting of a major sequence of numbers in which successive numbers are separated by a first fixed increment starting from a minimum value other than zero and a plurality of minor sequences of numbers, each of said minor sequences representing binary numbers of said series lying between respective successive numbers of said major sequence, each number of a minor sequence except for the first number being spaced from a preceding number thereof by a second fixed increment, the first number of a minor sequence being separated from the corresponding preceding number in said major sequence by said second fixed increment and the last number of a minor sequence spaced from the corresponding succeeding number in said major sequence by said second fixed increment, first means for providing a first binary word of k bits, each of the binary values thereof corresponding to a respective number of said major sequence, second means for providing a second binary word of $N-(k+1)$ bits, each of the binary values thereof corresponding to a respective number in each of said minor sequences, adding means for adding a one to said first binary word of k bits to obtain a third binary word of $k+1$ bits, constituting means for constituting the bits of said third word as the most significant bits of said N bit word and for constituting the bits of said second word as the least significant bits of said N bit word.

2. The apparatus of claim 1 in which said means includes means in which the initial adding operation of said adding means adds a one to the least significant bit of said first word to obtain a first sum representing the least significant bit of said third word, in which in each successive adding operation the carry bit of a preceding adding operation is added to a respective successively more significant bit of said first word to obtain a respective sum representing the respective successively more significant bit of said third word, and in which the carry bit of the last adding operation provides the most significant bit of said third word.

3. The apparatus of claim 2 in which said adding means includes an adder having a pair of inputs, a sum output and a carry output, and a carry transfer means for providing a carry input of one to one of said inputs of said adder for said initial adding operation and for supplying the carry output of said adder to said one input of said adder for each of the other of said adding operations, each of the bits of said first word starting with the least significant bit being applied in sequence to the other of said inputs of said adder, whereby successive sums obtained at the sum output of said adder represent bits of said third word starting from the least significant bit and the carry bit of said last adding operation represents the most significant bit of said third word.

4. The apparatus of claim 3 in which said carry transfer means is a type D flip-flop having a data terminal and an output terminal, said data terminal being connected to the carry output of said adder and said output terminal being connected to said one input of said adder, and in which said output terminal of said type D flip-flop is set to provide a one for said initial adding operation 5. The apparatus of claim 2 in which said adding means includes a plurality of adders each having a pair of inputs, a sum output and a carry output, each of the bits of said first word starting with the least significant bit being applied to one input of a respective one of said adders, means for applying an input of a fixed value of one to the other input of the adder associated with the least significant bit of said first word, means for connecting the carry output of each of said adders except the adder associated with the most significant bit of said first word to the other input of a respective succeeding adder, whereby at the sum output of each of said adders are obtained the successive bits of said third word starting with the least significant next to the most significant bit and at the carry output of the adder associated with the most significant bit of said first word is obtained the most significant bit of said third word.

6. The apparatus of claim 1 in which said constituting means includes a serial shift register having N stages, and means for entering each of the bits of said second word and said third word into a respective stage of said shift register in sequence to constitute said N bit word therein.

7. Apparatus for providing an N bit word representing a series of binary numbers, said series consisting of a major sequence of numbers in which successive numbers are separated by a first fixed increment starting from a minimum value other than zero and a plurality of minor sequences of numbers, each of said minor sequences representing binary numbers of said series lying between respective successive numbers of said major sequence, each number of a minor sequence except for the first number being spaced from a preceding number thereof by a second fixed increment, the first number of a minor sequence being separated from the corresponding preceding number in said major sequence by said fixed increment and the last number of a minor sequence spaced from the corresponding succeeding number in said major sequence by said second fixed increment, first means for providing a first binary word of k bits, each of the binary values thereof corresponding to a respective number of said major sequence, second means for providing a second binary word of $N-(k+1)$ bits, each of the binary values thereof corresponding to a respective number in each of said minor sequences, means including a first shift register and an adder for adding a one to said first binary word of k bits to obtain a third binary word of $k+1$ bits, said first shift register including a plurality of stages serially connected, each stage having a parallel input, said first shift register having a serial output, said adder having a pair of inputs, a sum output and a carry output, means for connecting the output of said first shift register to an input of said adder, carry transfer means for supplying the carry output of said adder to the other input of said adder, a second shift register including a plurality of stages serially connected, each stage having a parallel input, said second shift register having a serial input and a serial output, means for connecting the sum output of said adder to the serial input of said second shift register, means for providing a fixed value of one, means for making available for entry of said first word in the stages of said first shift register at the parallel inputs thereof with the least significant bit thereof in the stage adjacent the output of said first shift register, means for making available for entry of said second word in the stages of said second shift register at the parallel inputs thereof with the least significant bit thereof in the stage adjacent the output of said second shift register, means for simultaneously loading said first and second words in said first and second shift registers, respectively, and for entering said fixed value of one at the other input of said adder, means for clocking said first and second shift registers and said carry transfer means to obtain said third and second words in sequence at the output of the said second shift register.

* * * * *